United States Patent
Siegers et al.

(10) Patent No.: US 9,815,929 B2
(45) Date of Patent: Nov. 14, 2017

(54) BUTYL RUBBER IONOMER-THERMOPLASTIC GRAFT COPOLYMERS AND METHODS FOR PRODUCTION THEREOF

(71) Applicant: LANXESS Butyl Pte. Ltd., Singapore (SG)

(72) Inventors: Conrad Siegers, Edmonton (CA); Richard Steevensz, Corruna (CA)

(73) Assignee: LANXESS, Inc., Sarnia, CA (US)

( * ) Notice: Subject to any disclaimer, the term of this patent is extended or adjusted under 35 U.S.C. 154(b) by 0 days.

(21) Appl. No.: 14/767,160

(22) PCT Filed: Feb. 12, 2014

(86) PCT No.: PCT/CA2014/050098
§ 371 (c)(1),
(2) Date: Aug. 11, 2015

(87) PCT Pub. No.: WO2014/124535
PCT Pub. Date: Aug. 21, 2014

(65) Prior Publication Data
US 2015/0376320 A1    Dec. 31, 2015

Related U.S. Application Data

(60) Provisional application No. 61/763,509, filed on Feb. 12, 2013.

(51) Int. Cl.
| C08F 236/08 | (2006.01) |
| C08F 279/02 | (2006.01) |
| C08C 19/22 | (2006.01) |
| C08C 19/28 | (2006.01) |
| C08C 19/14 | (2006.01) |
| C08C 19/24 | (2006.01) |
| C08F 8/46 | (2006.01) |

(52) U.S. Cl.
CPC ............ C08F 236/08 (2013.01); C08C 19/14 (2013.01); C08C 19/22 (2013.01); C08C 19/24 (2013.01); C08C 19/28 (2013.01); C08F 8/46 (2013.01); C08F 279/02 (2013.01)

(58) Field of Classification Search
CPC ........ C08F 236/08; C08F 279/02; C08F 8/46; C08C 19/22; C08C 19/24; C08C 19/28
See application file for complete search history.

(56) References Cited

U.S. PATENT DOCUMENTS

| 2,656,128 A | 10/1953 | Horns |
| 3,643,166 A | 2/1972 | Mc Curnin |
| 3,983,062 A * | 9/1976 | Baldwin ................ C08F 8/12 524/156 |
| 5,159,014 A | 10/1992 | Tsutsumi et al. |
| 2004/0010089 A1 * | 1/2004 | Ashiura ................ C08F 8/46 525/242 |
| 2008/0081872 A1 | 4/2008 | Osman |
| 2008/0207815 A1 | 8/2008 | Resendes et al. |
| 2009/0018289 A1 | 1/2009 | Resendes et al. |
| 2009/0299000 A1 * | 12/2009 | Resendes ............ C08F 210/12 524/576 |
| 2010/0009778 A1 | 1/2010 | Rajagopalan et al. |
| 2010/0010140 A1 | 1/2010 | Resendes et al. |

FOREIGN PATENT DOCUMENTS

GB    1589985    5/1981

OTHER PUBLICATIONS

Wiktionary "Dienophile"; https://web.archive.org/web/20111205001016/http://en.wiktionary.org/wiki/dienophile; 2007.*
Wikipedia "Nucleophile"; https://web.archive.org/web/20120814224857/http://en.wikipedia.org/wiki/Nucleophile; 2012.*
Sabaa, M., "Maleic Anhydride Grafted Rubbers for Metallic Surfaces Lamination,", Journal of Applied Polymer Science, vol. 108, 2008, pp. 850-857.
European Search Report from co-pending Application EP14751637 dated Aug. 30, 2016, 2 pages.
Parent,J.S. "Amine Substitutionn Reactions of Brominated Poly(isobutylene-co-isoprene): New Chemical Modification and Cure Chemistry", Macromolecules 2002, 35, , pp. 3374-3379, Departments of Chemical Engineering and Chemistry, Queen's University, Kingston, Ontario, Canada K7L 3N6.
Parent, J.S. "Synthesis and Characterization of Isobutylene-Bsed Ammonium and Phosphonium Bromide Ionomers", Macromolecules 2004, 37, pp. 7477-7483, Departments of Chemical Engineering and Chemistry, Queen's University, Kingston, Ontario, Canada K7L 3N6.
Morton, M. "Butyl and Halobutyl Rubbers", Rubber Technology, Third Edition, American Chemical Society, pp. 297-300, Regents Professor Emeritus of Polymer Chemistry, The University of Akron, Akron, Ohio.

* cited by examiner

Primary Examiner — Roberto Rabago

(57) ABSTRACT

The present invention is directed to the functionalization of butyl rubber ionomer and optionally the grafting of polyamide to halobutyl rubber ionomers. Specifically, disclosed are methods and products resulting therefrom for creating functionalized ionomers and grafting polyamide to halobutyl ionomers via reactive extrusion. The process comprises reacting a halobutyl polymer with at least one nitrogen and/or phosphorous based nucleophile to provide a halobutyl ionomer comprising conjugated diene units; grafting of an amine-reactive dienophile to said ionomer to form a functionalized ionomer; and optionally blending the resulting functionalized ionomer with polyamide.

13 Claims, No Drawings

BUTYL RUBBER IONOMER-THERMOPLASTIC GRAFT COPOLYMERS AND METHODS FOR PRODUCTION THEREOF

FIELD OF THE INVENTION

The present invention is directed to the grafting of butyl rubber ionomers to thermoplastics, such as polyamides, in order to form butyl rubber ionomer-thermoplastic graft copolymers. The invention is also related to methods for production of the graft copolymers, particularly methods employing extruders at elevated temperatures.

BACKGROUND OF THE INVENTION

Poly(isobutylene-co-isoprene) or IIR, is a synthetic elastomer commonly known as butyl rubber (or butyl polymer) which has been prepared since the 1940's through the random cationic copolymerization of isobutylene with small amounts of isoprene (usually not more than 2.5 mol %). As a result of its molecular structure, IIR possesses superior air impermeability, a high loss modulus, oxidative stability and extended fatigue resistance.

Butyl rubber is understood to be a copolymer of an isoolefin and one or more, preferably conjugated, multiolefins as comonomers. Commercial butyl comprises a major portion of isoolefin and a minor amount, usually not more than 2.5 mol %, of a conjugated multiolefin. Butyl rubber or butyl polymer is generally prepared in a slurry process using methyl chloride as a diluent and a Friedel-Crafts catalyst as part of the polymerization initiator. This process is further described in U.S. Pat. No. 2,356,128 and Ullmanns Encyclopedia of Industrial Chemistry, volume A 23, 1993, pages 288-295.

Halogenation of this butyl rubber produces reactive allylic halide functionality within the elastomer. Conventional butyl rubber halogenation processes are described in, for example, Ullmann's Encyclopedia of Industrial Chemistry (Fifth, Completely Revised Edition, Volume A231 Editors Elvers, et al.) and/or "Rubber Technology" (Third Edition) by Maurice Morton, Chapter 10 (Van Nostrand Reinhold Company (c) 1987), pp. 297-300.

The development of halogenated butyl rubber (halobutyl, or XIIR) has greatly extended the usefulness of butyl by providing much higher curing rates and enabling co-vulcanization with general purpose rubbers such as natural rubber and styrene-butadiene rubber. Butyl rubber and halobutyl rubber are high value polymers, as their unique combination of properties (for example, excellent impermeability, good flex, good weatherability, co-vulcanization with high unsaturation rubbers, in the case of halobutyl) make them preferred materials for various applications, such as their use in making tire inner tubes and tire inner liners.

Like other rubbers, for most applications, butyl rubber must be compounded and vulcanized (chemically cross-linked) to yield useful and durable end products.

Reactive extrusion is sometimes used for making graft copolymers at commercial scale. This technology typically employs high process temperatures; however, previous research has shown that, at elevated temperatures (>140° C.), halobutyl rubbers XIIR are known to decompose as a result of HX elimination accelerating β-scissions of allyl cation intermediates, which leads to fragmentations.

This thermal decomposition, as described by Parent et al in *Macromolecules* 2002, 35, 3374-3379, renders, for example, BIIR incompatible with extrusion conditions necessary to graft polyamide onto butyl rubber. As a result, it ultimately precludes halobutyl rubbers, notably bromobutyl rubbers from being used in high-temperature compounding.

There exists prior art relating to ionomer formation from halogenated butyl polymer. For example, R. Resendes et al. in US20090299000 teach how halogenated butyl polymer is converted into an ionomer using N- and P-nucleophiles. The preparation of isobutylene-based ionomers through displacement of halide from brominated poly(isobutylene-co-isoprene) (BIIR) by triphenylphosphine (PPh3) and N,N-dimethyloctylamine (DMOA) is demonstrated J. S. Parent et al. in "Synthesis and Characterization of Isobutylene-based Ammonium and Phosphonium Bromide Ionomers," *Macromolecules* 37, 7477-7483, 2004. R. Resendes et al. in US20100010140 discloses a peroxide curable rubber nanocomposite compound comprising a peroxide curative, a nanoclay and a high multiolefin halobutyl ionomer prepared by reacting a halogenated butyl polymer having a high mol percent of multiolefin with at least one nitrogen and/or phosphorus based nucleophile. The resulting high multiolefin halobutyl ionomer comprises from about 2 to 10 mol % multiolefin. The present invention is also directed to a shaped article comprising the rubber compound.

There also exists prior art relating to the grafting of non-halogenated amine-reactive compounds (i.e., maleic anhydride, glycidyl acrylate, glycidyl methacrylate) to halobutyl via Diels-Alder reaction, and/or the use of the product of these reactions in blends with polyamides.

For example, GB Patent 1589985 teaches how to convert a halogenated butyl rubber into a conjugated butyl rubber and then to react it with MAH or maleic imide in Diels-Alder reaction.

U.S. Pat. No. 3,646,166 teach how to use halogenated butyl rubber and form conjugated double bonds in its structure, then react it with MAH forming a graft polymer of butyl rubber with MAH and react this graft polymer with an amine in solution forming a final reaction product.

EP0361769A2 describes the grafting of the amine-reactive grafting materials MAH, acrylic acid, and glycidyl methacrylate to halobutyl and its subsequent use of the resulting functional butyl elastomer in blending with polyamides. EP0361769A2 teaches that chlorobutyl is converted to conjugated diene butyl in a solution process and subsequently reacted with MAH, acrylic acid, and glycidyl methacrylate in a reactive mixing process. EP0361769A2 further teaches the blending of said modified butyl elastomers with polyamides.

However, heat instability of these polymers make them unsuitable for use in reactive extrusion processes for bonding with polyamides, which typically employ high process temperature. In addition, these polyamide-halobutyl grafts do not exhibit commercially useful physical properties, particularly in the case of Mooney viscosity, ultimate tensile strength and ultimate elongation. Further, these polyamide-halobutyl grafts are not suitable for pelletization, which makes them difficult to store, transport and work with at a commercially relevant production scale.

As a result, there remains a need to develop an economical approach for the grafting of polyamide to halobutyl rubber.

SUMMARY OF THE INVENTION

An objective of the present invention is to develop a butyl rubber-polyamide graft copolymer and a process and method for making this graft copolymer at a commercially relevant scale using, for example, reactive extrusion technology.

The present invention addresses the afore-mentioned problems by starting from a halobutyl rubber containing allylic halide and partially or completely converting the allylic halide functionality in the rubber backbone into an ionomer salt by reaction with a nitrogen or phosphorous based nucleophile, such as triphenylphosphine (TPP). The resulting butyl ionomer demonstrates increased thermal stability, allowing it to be reacted with the polyamide under high temperature extrusion conditions.

Prior to polyamide grafting, the butyl ionomers are optionally reacted with amine reactive dienophiles, for example maleic anhydride (MAH), through Diels-Alder reaction. This increases the degree of grafting of the butyl rubber ionomer to the polyamide under extrusion conditions.

According to an aspect of the invention, there is provided a method for preparing a butyl graft copolymer which comprises: reacting a halobutyl polymer with at least one nitrogen and/or phosphorous based nucleophile to provide a halobutyl ionomer; and, grafting a non-halogenated amine-reactive dienophile to said ionomer through a reactive mixing process to provide a functionalized ionomer.

The halobutyl polymer may comprise repeating units derived from at least on isoolefin, for example isobutylene, and at least one multiolefin, for example a conjugated diene, such as isoprene. Optionally, the halobutyl polymer may additionally comprise repeating units that are copolymerizable with isoolefins and/or dienes, for example vinyl aromatic monomers, such as p-methylstyrene. The halogen may be bromine or chlorine, preferably bromine. The nitrogen or phosphorous based nucleophile may comprise triphenylphosphine. The dienophile may comprise maleic anhydride (MAH). The method may take place in an extruder. The nucleophile and dienophile may be added to the extruder. The method may further comprise pelletizing the functionalized ionomer following the grafting step.

The method may further comprise blending the functionalized ionomer with an amino-containing thermoplastic under conditions suitable to form a butyl rubber ionomer-thermoplastic graft copolymer, optionally in a reactive extrusion process. The grafting and blending steps may be implemented in the same extruder by providing the dienophile and ionomer at the beginning of the extruder and adding said thermoplastic at a later point, for example along a barrel of the extruder.

According to an aspect of the invention, there is provided a functionalized butyl ionomer comprising: repeating units derived from at least one isoolefin monomer and at least one multiolefin monomer; an ionomeric moiety on the repeating units derived from the multiolefin monomer corresponding to the reaction product of a nitrogen or phosphorous based nucleophile and an allylic halide; an amine reactive functional group corresponding to the grafting of an amine reactive dienophile to the repeating units derived from the multiolefin monomer.

The functionalized ionomer may have a Mooney viscosity of at least 20 Mooney units and an ultimate tensile strength of at least 15 MPa.

According to another aspect of the invention, there is provided a butyl rubber ionomer-thermoplastic graft copolymer comprising: repeating units derived from at least one isoolefin monomer and at least one multiolefin monomer; an ionomeric moiety on the repeating units derived from the multiolefin monomer corresponding to the reaction product of a nitrogen or phosphorous based nucleophile and an allylic halide; an amine reactive functional group corresponding to the grafting of an amine reactive dienophile to the repeating units derived from the multiolefin monomer; and, an amino-containing thermoplastic grafted to the amine reactive functional group. The amino-containing thermoplastic may comprise a polyamide, for example a nylon thermoplastic. The thermoplastic graft copolymer may have an ultimate tensile strength of at least 6 MPa and an elongation at break of at least 150%.

According to an aspect of the invention, there is provided a process for grafting polyamide to halobutyl ionomer via reactive extrusion, said process comprising: (a) reacting a halobutyl polymer with at least one nitrogen and/or phosphorous based nucleophile to provide a halobutyl ionomer comprising conjugated diene units; (b) grafting an amine-reactive dienophile to said ionomer resulting from step (a); and (c) blending the resulting dienophile grafted ionomer with polyamide under reactive extrusion conditions.

According to one embodiment of the invention, both reactions (b) and (c) can be implemented in the same extrusion step by feeding dienophile, and ionomer at the beginning of the extruder and adding polyamide (PA) to the extrudate at a later stage or barrel of the extruder, for example via a side-stuffer.

According to one embodiment of the invention, the preferred amine reactive dienophile is maleic anhydride (MAH). Compositions comprising at least 2 phr of MAH feature an enhanced elongation at break over a respective control composition without MAH.

According to one embodiment of the invention, the reaction process starts from commercial LANXESS halobutyl grades and chemicals available in bulk, and relies only on chemical modifications in two extrusion runs. Butyl ionomer can thereby be thermally grafted with dienophiles, such as MAH; the resulting MAH-grafted ionomer may bind to the polyamide when melt-blended under suitable conditions, for example as can be created using a reactive extrusion process.

According to one aspect of the invention, a method for preparing butyl ionomer-thermoplastic graft copolymers is disclosed which comprises:
 (a) reacting a halobutyl polymer with at least one nitrogen and/or phosphorous based nucleophile to provide a halobutyl ionomer;
 (b) grafting of non-halogenated amine-reactive dienophile compounds to said ionomer from step (a) through a reactive mixing process; and
 (c) blending of said non-halogenated amine-reactive compounds-grafted ionomer from step (b) with an amino-containing thermoplastic.

According to another aspect of the invention, there is disclosed a process for preparing a butyl graft polymer comprising the steps of:
 (a) providing a halobutyl polymer;
 (b) providing at least one nitrogen and/or phosphorous based nucleophile;
 (c) reacting the halobutyl polymer with the at least one nitrogen and/or phosphorous based nucleophile to provide a halobutyl ionomer comprising conjugated diene units;
 (d) grafting of an amine reactive dienophile to said ionomer from step to provide a dienophile-grafted ionomer; and
 (e) blending of said non-halogenated amine-reactive dienophile-grafted ionomer from step (d) with an amino-containing thermoplastic.

According to a further aspect of the invention, there is disclosed a functionalized butyl ionomer and a butyl ionomer-thermoplastic graft copolymer produced from the methods and processes described above.

DETAILED DESCRIPTION OF THE INVENTION

For the purposes of the subject matter disclosed herein, the terms "halobutyl rubber", "halobutyl polymer" and "halogenated isoolefin copolymer" may be used interchangeably. The halogenated copolymers used in the present invention are copolymers of at least one isoolefin monomer and one or more multiolefin monomers and optionally one or more alkyl substituted aromatic vinyl monomers.

Isoolefins having from 4 to 7 carbon atoms are suitable for use in the present invention. Specific examples of such $C_4$ to $C_7$ isomonoolefins include isobutylene, 2-methyl-1-butene, 3-methyl-1-butene, 2-methyl-2-butene, 4-methyl-1-pentene and mixtures thereof. The preferred $C_4$ to $C_7$ isomonoolefin monomer is isobutylene. Suitable $C_4$ to $C_8$ conjugated diolefins include, for example, 1,3-butadiene, isoprene, 2-methyl-1,3-pentadiene, 4-butyl-1,3-pentadiene, 2,3-dimethyl-1,3-pentadiene 1,3-hexadiene, 1,3-octadiene, 2,3-dibutyl-1,3-pentadiene, 2-ethyl-1,3-pentadiene, 2-ethyl-1,3-butadiene and the like, 1,3-butadiene and isoprene being preferred. The polymer based on an isoolefin and a conjugated diolefin monomer can be a copolymer comprising one or more conjugated diene monomers, or a terpolymer comprising a conjugated diene monomer and a vinyl aromatic monomer.

If vinyl aromatic monomers are used, they should be copolymerizable with the other monomers being employed. Generally, any vinyl aromatic monomer that is known to polymerize with organo alkali metal initiators can be used. Such vinyl aromatic monomers usually contain in the range of from 8 to 20 carbon atoms, preferably from 8 to 14 carbon atoms. Examples of suitable such vinyl aromatic monomers include styrene, alpha-methyl styrene, various alkyl styrenes including p-methylstyrene, p-methoxy styrene, 1-vinylnaphthalene, 2-vinyl naphthalene, 4-vinyl toluene and the like. P-methylstyrene is the preferred alkyl-substituted vinyl aromatic monomer.

In one embodiment, the halogenated copolymer used in the formation of the ionomer of the present invention comprises at least one allylic halogen moiety.

In one embodiment, the halogenated copolymer comprises repeating units derived from at least one isoolefin monomer and repeating units derived from one or more multiolefin monomers. In such an embodiment, one or more of the repeating units derived from the multiolefin monomers comprise an allylic halogen moiety.

In one embodiment, the halogenated copolymer is obtained by first preparing a copolymer from a monomer mixture comprising one or more isoolefins and one or more multiolefins, followed by subjecting the resulting copolymer to a halogenation process to form the halogenated copolymer. Halogenation can be performed according to the process known by those skilled in the art, for example, the procedures described in Rubber Technology, 3rd Ed., Edited by Maurice Morton, Kluwer Academic Publishers, pp. 297-300 and further documents cited therein.

During halogenation, some or all of the multiolefin content of the copolymer is converted to units comprising allylic halides. The total allylic halide content of the halogenated polymer cannot exceed the starting multiolefin content of the parent copolymer.

In one embodiment, the monomer mixture used in preparing the butyl rubber comprises from about 80% to about 99.5% by weight of at least one isoolefin monomer and from about 0.5% to about 20% by weight of at least one multiolefin monomer. In one embodiment, the monomer mixture comprises from about 83% to about 98% by weight of at least one isoolefin monomer and from about 2.0% to about 17% by weight of a multiolefin monomer.

In one embodiment, the butyl polymer comprises at least 0.5 mol % repeating units derived from the multiolefin monomers. In one embodiment, the repeating units derived from the multiolefin monomers are at least 0.75 mol %. In one embodiment, the repeating units derived from the multiolefin monomers are at least 1.0 mol %. In one embodiment, the repeating units derived from the multiolefin monomers are at least 1.5 mol %. In one embodiment, the repeating units derived from the multiolefin monomers are at least 2.0 mol %. In one embodiment, the repeating units derived from the multiolefin monomers are at least 2.5 mol %. In one embodiment, the multiolefin butyl polymer comprises at least 3.0 mol % repeating units derived from the multiolefin monomers. In one embodiment, the repeating units derived from the multiolefin monomers are at least 4.0 mol %. In one embodiment, the repeating units derived from the multiolefin monomers are at least 5.0 mol %. In one embodiment, the repeating units derived from the multiolefin monomers are at least 6.0 mol %. In one embodiment, the repeating units derived from the multiolefin monomers at least 7.0 mol %.

In one embodiment, the repeating units derived from the multiolefin monomers are from about 0.5 mol % to about 20 mol %. In one embodiment, the repeating units derived from the multiolefin monomers are from about 0.5 mol % to about 8 mol %. In one embodiment, the repeating units derived from the multiolefin monomers are from about 0.5 mol % to about 4 mol %. In one embodiment, the repeating units derived from the multiolefin monomers are from about 0.5 mol % to about 2.5 mol %.

In one embodiment, the halogenated copolymer for use in the present invention includes a halogenated butyl rubber formed from isobutylene and less than 2.2 mol % isoprene, which is commercially available from LANXESS Deutschland GmbH and sold under the names Bromobutyl 2030™, Bromobutyl 2040™ and Bromobutyl X2™.

In one embodiment, the halogenated copolymer for use in the present invention includes a high isoprene halogenated butyl rubber formed from isobutylene and at least 3 mol % isoprene or at least 4% isoprene, as described in Canadian Patent Application No. 2,578,583 and 2,418,884, respectively.

In one embodiment, the halogenated copolymer of the present invention comprises copolymers of at least one isoolefin, one or more multiolefin monomers, and one or more alkyl substituted aromatic vinyl monomers. In such an embodiment, one or more units derived from the multiolefin monomers comprise an allylic halogen moiety.

In one embodiment, the monomer mixture used in preparing the copolymer of isoolefin, the multiolefin and the alkyl substituted aromatic vinyl monomers comprise from about 80% to about 99% by weight of isoolefin monomers, from about 0.5% to about 5% by weight the multiolefin monomers, and from about 0.5% to about 15% by weight of the alkyl substituted aromatic vinyl monomers. In one embodiment, the monomer mixture comprises from about 85% to about 99% by weight of isoolefin monomer, from about 0.5% to about 5% by weight the multiolefin monomer and from about 0.5% to about 10% by weight alkyl substituted aromatic vinyl monomer.

The mixture used to produce multiolefin butyl rubber polymer may further comprise a multiolefin cross-linking agent. The term cross-linking agent is a term known to a person skilled in the art and is understood to denote a compound that causes chemical cross-linking between the polymer chains as opposed to a monomer that will add to the chain. Examples of suitable cross-linking agents include norbornadiene, 2-isopropenylnorbornene, 2-vinyl-norbornene, 1,3,5-hexatriene, 2-phenyl-1,3-butadiene, divinylbenzene, diisopropenylbenzene, divinyltoluene, divinylxylene and $C_1$ to $C_{20}$ alkyl-substituted derivatives thereof. More preferably, the multiolefin crosslinking agent is divinyl-benzene, diisopropenylbenzene, divinyltoluene, divinyl-xylene and $C_1$ to $C_{20}$ alkyl-substituted derivatives thereof, and/or mixtures of the compounds given. Most preferably, the multiolefin cross-linking agent comprises divinyl-benzene and diiso-propenylbenzene.

The halobutyl rubber or halobutyl polymer should have a total allylic halide content from 0.05 to 2.0 mol %, more preferably from 0.2 to 1.0 mol % and even more preferably from 0.5 to 0.8 mol %. In cases where there is residual multiolefin, the residual multiolefin level is the balance of the starting multiolefin content less the allylic halide content.

The ionomers of the present invention are obtained by reacting a halobutyl rubber (i.e. halogenated isoolefin copolymer) with a nucleophile under reaction conditions well known in the prior art.

According to the process of the present invention, the halobutyl polymer can be reacted with at least one nitrogen and/or phosphorus containing nucleophile according to the following formula:

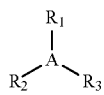

wherein A is a nitrogen or phosphorus, $R_1$, $R_2$ or $R_3$ is selected from the group consisting of linear or branched $C_1$-$C_{18}$ alkyl substituents, an aryl substituent which is monocyclic or composed of fused $C_4$-$C_8$ rings, and/or a hetero atom selected from, for example, B, N, O, Si, P, and S.

In general, the appropriate nucleophile will contain at least one neutral nitrogen or phosphorus center which possesses a lone pair of electrons which is both electronically and sterically accessible for participation in nucleophilic substitution reactions. Suitable nucleophiles include trimethylamine, triethylamine, triisopropylamine, tri-n-butylamine, trimethylphosphine, triethylphosphine, triisopropylphosphine, tri-n-butylphosphine, and triphenylphosphine (TPP).

According to one embodiment of the invention, the amount of nucleophile reacted with the halobutyl copolymer is in the range from 0.1 to 5 molar equivalents, more preferable 0.1 to 1 molar equivalents and more preferably 0.1 to 0.5 molar equivalents based on the total molar amount of allylic halide present in the high multiolefin halobutyl polymer.

In one embodiment, the halobutyl based ionomer possesses from 0.05 to 2.0 mol % ionomeric groups. In another embodiment of the present invention, the halobutyl based ionomer possesses from 0.2 to 1.0 mol % ionomeric groups. In another embodiment of the present invention, the halobutyl based ionomer possesses from 0.2 to 0.5 mol % ionomeric groups. In another embodiment of the present invention, the halobutyl based ionomer possesses from 0.5 to 0.8 mol % ionomeric groups.

According to one embodiment of the invention, the resulting ionomer is a mixture of the polymer-bound ionomeric moiety and allylic halide such that the total molar amount of ionomeric moiety and allylic halide functionality are present in the range not exceeding the original allylic halide content, such as from 0.05 to 2.0 mol %, more preferably from 0.2 to 1.0 mol % and even more preferably from 0.5 to 0.8 mol % with residual multiolefin being present in the range from 0.2 to 1.0 mol % and even more preferably from 0.5 to 0.8 mol %.

According to another embodiment of the invention, the resulting ionomer comprises only the polymer-bound ionomeric moiety with essentially no remaining allylic halide functionality.

The non-halogenated amine-reactive grafting material contains a $C_4$ to $C_{16}$ unsaturated carboxylic acid derivative. Any compound that combines a C=C double bond and a carboxylic acid or carboxylic acid derived group in the same molecule can be used according to the present invention. The carboxylic acid derived group may be selected from the list of carboxylic acid, carboxylic amides, carboxylic esters, carboxylic acid halides and carboxylic anhydrides. The unsaturated carboxylic acid derivatives may be selected from the group consisting of maleate, itaconate, acrylate, methacrylate, hemic acid salts or the corresponding carboxylic acids, amides, esters and anhydrides, and their C1 to C16 alkyl-substituted derivatives. Preferably, the carboxylic acid derivative is an anhydride. More preferably the unsaturated carboxylic acid derivative is a cyclic anhydride. The unsaturated carboxylic acid derivative may be selected from the group consisting of maleic anhydride, chloromaleic anhydride, itaconic anhydride, hemic anhydride or the corresponding dicarboxylic acids, such as maleic acid or fumaric acid, or their esters. Preferably, the unsaturated carboxylic acid derivative is maleic anhydride.

By conventional definition, a thermoplastic is a synthetic resin that softens when heat is applied and regains its original properties upon cooling. For purposes of the present invention, a thermoplastic (alternatively referred to as thermoplastic resin) is a thermoplastic polymer, copolymer, or mixture thereof optionally having a Young's modulus of more than 200 MPa at 23° C. The resin has a melting temperature of about 160° C. to about 260° C. Thermoplastic resins may be used singly or in combination. At least one of the thermoplastic resins used comprises an amino group, such as is present in, for example, polyamides.

Suitable polyamides (nylons) comprise crystalline or resinous, high molecular weight solid polymers including copolymers and terpolymers having recurring amide units within the polymer chain. Polyamides may be prepared by polymerization of one or more epsilon lactams such as caprolactam, pyrrolidione, lauryllactam and aminoundecanoic lactam, or amino acid, or by condensation of dibasic acids and diamines. Both fiber-forming and molding grade nylons are suitable. Examples of such polyamides are polycaprolactam (nylon-6), polylauryllactam (nylon-12), polyhexamethyleneadipamide (nylon-6,6) polyhexamethyleneazelamide (nylon-6,9), polyhexamethylenesebacamide (nylon-6,10), polyhexamethyleneisophthalamide (nylon-6, IP) and the condensation product of 11-amino-undecanoic acid (nylon-11). Commercially available polyamides may be advantageously used in the practice of this invention, with linear crystalline polyamides having a softening point or melting point between 160° C. and 260° C. being preferred.

An illustrative example of a reaction scheme whereby halobutyl rubber (XIIR) is converted to a butyl-based ionomer (Iono-XIIR) by reaction with a nitrogen or phosphorous based nucleophile is shown in Scheme 1, below. Iono-XIIR is further reacted with an amine reactive grafting material, such as the dienophile maleic anhydride, resulting in the functional group grafted butyl-based ionomer (FG-Iono-XIIR) or functionalized butyl ionomer. The latter is amenable to the grafting of polyamide (PA) in a melt-mixing process, such as a reactive extrusion process, leading to a blend where some or all of PA is covalently grafted to some or all of the functionalized butyl ionomer (PA-FG-Iono-XIIR).

Scheme 1

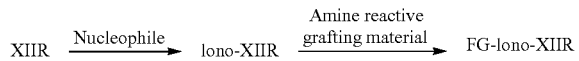

According to one embodiment of the invention, both (i) the thermal grafting of dienophile, to conjugated diene or allylic halo butyl ionomer through Diels-Alder cycloaddition and (ii) the blending of the resulting dienophile-grafted ionomer with polyamide, can be implemented in the same extrusion step by providing dienophile and ionomer at the beginning of the extruder and adding a thermoplastic (polyamide) at a later point along a barrel of the extruder.

A functionalized butyl ionomer according to the invention desirably exhibits a preferred blend of properties. For example, the functionalized butyl ionomer desirably exhibits a Mooney viscosity of at least 20 and an ultimate tensile strength of at least 15 MPa. The functionalized butyl ionomer can be processed at temperatures of up to 260 C prior to measuring this desirable balance of physical properties. This makes it amenable to processing in an extruder.

When the functionalized butyl ionomer is used to form a butyl ionomer grafted thermoplastic copolymer, said copolymer desirably exhibits an ultimate tensile strength of at least 6 MPa and/or an elongation at break of at least 150% or at least 175%. Butyl ionomer grafted thermoplastic copolymers formed using a non-functionalized butyl ionomer desirably exhibit an ultimate tensile strength of from 5 to 5.9 MPa and/or an elongation at break of from 95% to 149%.

EXPERIMENTAL

General

Extrusion of selected commercial butyl rubber grades experimental butyl ionomer grades was conducted in the presence of, and without MAH, respectively. The purification of an aliquot of the extrudates led to sample for characterization by $^1$H NMR and IR. Respective polyamide rubber blends were also prepared. These extrudates emerged as strands or pellets and were further processed into dumbbells via injection molding or into thin sheets via compression molding to be subjected to tensile testing and gravimetric extraction, respectively.

Materials

Commercial materials used in the examples are outlined in Table 1.

TABLE 1

| Chemical name | Supplier | Trade name |
|---|---|---|
| Butyl rubber | LANXESS | LANXESS Butyl 402 |
| Bromobutyl rubber | LANXESS | LANXESS Bromobutyl 2030 LANXESS Bromobutyl X2 |
| Maleic anhydride (MAH) | Sigma-Aldrich | Maleic anhydride |
| Polyamide 612 | EMS-Grivory | Grilon CR8 |
| Polyamide 6I | LANXESS | Durethan CI 31 F |
| n-Butylbenzene Sulfonamide | LANXESS | Uniplex 214 |
| Talc | Imerys Talc | Mistron CB |
| Pentaerythritol Tetrakis(3-(3,5-di-t-butyl-4-hydroxyphenyl)propionate) | Ciba | Irganox 1010 |

Extrusion for Examples 1a-4b

Extrusion was performed in a Leistritz ZSE27MX-48D co-rotating twin screw extruder at a temperature between 100° C. to 250° C., between 50-300 rpm. The extruder had a screw diameter of 27 mm, L/D ratio of 28:1 and 12 barrels/zones (including the die) with individual heating or cooling.

Soxhlet Extraction 3.0 g of PA containing samples were pressed into thin sheets. A portion of the sheet was subjected to a sequence of Soxleth extractions using glass microfibre thimbles.

The masses of the compounds and thimbles were recorded before beginning extraction. The thimbles were added to the Soxhlet apparatus and extracted with refluxing toluene for 4 h, formic acid for 4 h, toluene for 4 h, and finally formic acid for 4 h again. After the final extraction, the thimbles were dried under vacuum and % mass remaining was calculated. In cases where there was residual mass, the residue was characterized by ATR IR spectroscopy.

Purification of Extrudates

Extrudates that did not contain thermoplastic were purified for use in IR and NMR analysis to remove any ungrafted MAH or other volatiles which may interfere in analysis. A small amount of sample (<1 g) was dissolved in toluene at room temperature. The compound was then coagulated out with acetone and any excess solvent was allowed to air dry. This process was repeated. Samples were finally dried in a vacuum oven overnight before analysis.

DSM Injection Molding

The compounds which contained PA were injection molded in the DSM Xplore Micro-compounder (DSM) to form dumbbells for tensile testing. The DSM was heated to 220° C. and approximately 12 grams of each compound (as pellets or strands) was added to the barrel (100 rpm) and allowed to melt for 2 min. The compound was then injection molded into the S2 micro-dumbbell mold.

Tensile Test

Injection molded S2 micro-dumbbells were measured in triplicate for stress-strain properties on the T2000 Tensometer according to ASTM D412.

Mooney Viscosity

If applicable, extrudates were analyzed by Mooney Viscosity measurements ML 1+8 @ 125° C. (ASTM D1646).

Extension Cycling Fatigue

Samples were tested according to ASTM D 4482 with the exception of the strain cycle. This standard method requires the use of a tester controlled by cams to induce a strain cycle consisting of increasing strain for one quarter the time, decreasing strain for one quarter the time, then zero strain for half the time (pulsed-type test). Here, samples were tested using the DeMattia flex tester, which induced an increasing strain for half the time and a decreasing strain for half the time. Injection molded Die C dumbbells were cyclically strained at 1.7 Hz (100 cpm) to a specified initial extension ratio. The extension ratio is defined as $L \, L_0^{-1}$ where L is the extended length of the specimen and $L_0$ is the unextended length. As a result of the flexing, cracks usually initiated by a naturally occurring flaw, grow and ultimately cause failure. The fatigue life of the specimen was determined by the number of cycles to failure, where failure was defined by complete rupture of the sample. A bench mark of 25 mm was placed on the sample to determine the initial extension ratio. After 1000 cycles, the grips were adjusted for permanent set of the specimen, which reduces the extension ratio. The average number of cycles to failure for two specimens was reported. The initial extension ratio was 0.24.

Nuclear Magnetic Resonance (NMR)

NMR analysis was performed on a Bruker 500 MHz spectrometer in $CDCl_3$. NMR spectra of MAH-containing extrudates showed signals at 3.2 and 3.4 ppm, which have been previously attributed to the Diels-Alder adduct of the exo-CD unit with maleic anhydride. Mol % of grafted MAH was calculated from the integration of the above signals.

Examples 1a-4a

The butyl ionomer used in these examples were derived from LANXESS Bromobutyl 2030 and triphenylphosphine and had an ionic content of 0.5 mol % as well as a Mooney viscosity of 58. This set of examples was carried out in absence of thermoplastic in order to allow for processing and characterization of the resulting extrudates in solution. The butyl polymers were dusted with talc (7 phr). The extrudate composition is stated in Table 2 for each example. The composition was extruded as described above. The extrudates were purified and subjected to IR and $^1H$ NMR analysis. Table 2 furthermore states the absence or presence for spectroscopic evidence for MAH grafting (i.e. IR absorbance at 1780 $cm^1$ and resonances in the $^1H$ NMR spectrum at 3.2 and 3.4 ppm).

TABLE 2

| | Example | | | |
|---|---|---|---|---|
| | 1a | 2a | 3a | 4a |
| | Example type | | | |
| | comparative | comparative | comparative | inventive |
| LANXESS Butyl 402 | 100 | 100 | 0 | 0 |
| Butyl ionomer | 0 | 0 | 100 | 100 |
| MAH (phr)[c] | 0 | 2 | 0 | 2 |
| Irganox 1010 (phr)[c] | 2 | 2 | 2 | 2 |
| Talc[c] | 4 | 2 | 4 | 2 |
| IR: MAH-absorbance at 1780 $cm^{-1}$ | absent | absent | absent | present |
| NMR: Resonances at 3.2 and 3.4 ppm | n.d. | n.d. | absent | present |

Table 2 shows that grafting of MAH is only successful if the combination of MAH and butyl ionomer is used. The extrusion of bromobutyl rubber in lieu of regular butyl and butyl ionomer resulted in an extrudate of unsuitably low viscosity.

Examples 1b-4b

The butyl ionomer used in these examples were derived from LANXESS Bromobutyl 2030 and triphenylphosphine and had an ionic content of 0.5 mol % as well as a Mooney viscosity of 58. This set of examples was carried out in presence of thermoplastic (Durethan CI 31 F). The butyl polymers were dusted with talc (7 phr). The extrudate composition is stated in Table 3 for each example. Extrusion took place at 219° C. average barrel temperature, 150 rpm. With exception of Durethan CI 31 F, all ingredients were fed into the extruder in Zone 0 with a rate of 5 kg $h^{-1}$; Durethan CI 31 F was added to the extruder via a side stuffer located at Zone 8 at a rate of 4.75 kg $h^{-1}$. The extrudates were pelletized, dried and injection molded into test specimen for further characterization by stress-strain measurements and extraction.

TABLE 3

| | Example | | | |
|---|---|---|---|---|
| | 1b | 2b | 3b | 4b |
| | Example type | | | |
| | comparative | comparative | comparative | inventive |
| LANXESS Butyl 402 (phr) | 100 | 100 | 0 | 0 |
| Butyl ionomer (phr) | 0 | 0 | 100 | 100 |
| Durethan CI 31 F (phr) | 103 | 103 | 103 | 103 |
| MAH (phr) | 0 | 2 | 0 | 2 |
| Irganox 1010 (phr) | 2 | 2 | 2 | 2 |
| Mistron CB (phr) | 4 | 2 | 4 | 2 |
| Mass Remaining after extraction (%) | 1.2 | 0.3 | 0.4 | 10.5 |
| IR of extraction residue: PA absorbance at 1650 $cm^{-1}$ | n.d. | n.d. | n.d. | present |
| Elongation at break (%) | 32 | 31 | 40 | 90 |
| Tensile strength (MPa) | 17.4 | 15.9 | 11.6 | 15.6 |

Example 4b, which was compounded based on MAH as well as an allylic bromide containing butyl ionomer, shows a significantly improved elongation at break over the remaining comparative examples (Examples 1 b, 2b and 3b). Furthermore, this blend does not dissolve completely upon extraction. IR analysis on the extraction residue furthermore shows the presence of absorption bands that are attributable to polyamide and butyl rubber. The residual masses observed upon extraction of MAH-containing Durethan CI 31 F/butyl ionomer blends supports that MAH mediates the covalent grafting between ionomeric butyl rubber and polyamide.

Examples 5-9

The butyl ionomer used in Examples 5-9 was derived from LANXESS Bromobutyl X2 and triphenylphosphine and had an ionic content of 0.3 mol % and a Mooney viscosity of 56. For Examples 5-9, a composition of 100 phr Ionomer with 3 phr talcum, 2 phr maleic anhydride and 1 phr Irganox 1010 were extruded using a co-rotating twin-screw extruder from Leistritz with a screw diameter of 27 mm and an L/D ratio of 57 at a throughput of 15 kg/h and 350 rpm using different temperature profiles. The temperature set values for the barrels (Zones 0-13 and Die) are given in Table 4. The Mooney viscosity and amount of grafted MAH, as determined from signals in the $^1$H NMR spectra of the Diels-Alder adduct formed for the individual examples is reported in Table 5. Results from Table 5 show that the higher the temperature, the higher is the amount of grafting achieved and the lower is the Mooney viscosity of the extrudate.

TABLE 4

| Barrel | Temperature profile | | | | |
|---|---|---|---|---|---|
| | #185 | #200 | #215 | #230 | #245 |
| 0 | 25° C. | 25° C. | 25° C. | 25° C. | 25° C. |
| 1 | 25° C. | 25° C. | 25° C. | 25° C. | 25° C. |
| 2 | 80° C. | 80° C. | 80° C. | 80° C. | 30° C. |
| 3 | 80° C. | 80° C. | 80° C. | 80° C. | 80° C. |
| 4 | 80° C. | 80° C. | 80° C. | 80° C. | 80° C. |
| 5 | 106° C. | 110° C. | 114° C. | 118° C. | 125° C. |
| 6 | 133° C. | 140° C. | 148° C. | 155° C. | 170° C. |
| 7 | 159° C. | 170° C. | 181° C. | 193° C. | 210° C. |
| 8 | 185° C. | 200° C. | 215° C. | 230° C. | 245° C. |
| 9 | 185° C. | 200° C. | 215° C. | 230° C. | 245° C. |
| 10 | 185° C. | 200° C. | 215° C. | 230° C. | 245° C. |
| 11 | 198° C. | 205° C. | 213° C. | 220° C. | 225° C. |
| 12 | 210° C. | 210° C. | 210° C. | 210° C. | 210° C. |
| 13 | 210° C. | 210° C. | 210° C. | 210° C. | 210° C. |
| Die | 205° C. | 205° C. | 205° C. | 205° C. | 205° C. |

TABLE 5

| Example | Temp. Profile | Mooney Viscosity [MU] | Grafted MAH [mol %] |
|---|---|---|---|
| Example 5 | #185 | 34 | 0.00 |
| Example 6 | #200 | 34 | 0.00 |
| Example 7 | #215 | 34 | 0.00 |
| Example 8 | #230 | 27 | 0.05 |
| Example 9 | #245 | 23 | 0.07 |

Table 5 shows that using temperatures according to temperature profile #230 or higher leads to grafting of maleic anhydride to butyl ionomer. In particular, temperature profile #230 leads to a desirable balance of Mooney viscosity and maleic anhydride grafting.

Examples 10-14

The butyl ionomer used in Examples 10-12 was derived from LANXESS Bromobutyl X2 and triphenylphosphine and had an ionic content of 0.3 mol % and a Mooney viscosity of 56. For Examples 10-14, the compositions stated in Table 6 were extruded (103 phr ionomer=100 phr ionic polymer with 3 phr talcum) using a co-rotating twin-screw extruder from Leistritz with a screw diameter of 27 mm and an L/D ratio of 57 at the throughput stated in said table and 200 rpm using temperature profile #230 described in Table 4. The Mooney viscosity and amount of grafted MAH, as determined from signals in the $^1$H NMR spectra of the Diels-Alder adduct formed for the individual examples is reported in Table 6. Also, pelletization of the extrudates by means of an underwater pelletizer was possible in Examples 10 through 12. The extrudates from comparative Examples 13 and 14 were too low in viscosity to be processed into pellets or to be subjected to a Mooney viscosity measurement. Comparative Examples 13 and 14 thus show that bromobutyl cannot be thermally grafted with maleic anhydride while maintaining a Mooney viscosity above 10, while Examples 10-12 show that a Mooney viscosity well above 10 is obtained when butyl ionomers are used. Examples 10 and 11 show that it is possible to graft maleic anhydride to butyl ionomer in a reactive mixing process, achieving grafting levels of greater than or equal to 0.05 mol %, for example grafting levels of 0.16-0.17 mol %

TABLE 6

| Example | Type | Composition [phr] | | | | | Results | | | |
|---|---|---|---|---|---|---|---|---|---|---|
| | | Ionomer | Bromobutyl X2 | MAH | Irganox 1010 | Talcum | Extruder throughput [kg/h] | Mooney Viscosity [MU] | Grafted MAH [mol %] | Pelletization possible |
| Ex. 10 | Inventive | 103 | | 2 | 1 | | 15.00 | 30 | 0.16 | Yes |
| Ex. 11 | Inventive | 103 | | 4 | 2 | | 15.45 | 25 | 0.17 | Yes |
| Ex. 12 | Comparative | 103 | | | 1 | 2 | 14.00 | 19 | 0.00 | Yes |
| Ex. 13 | Comparative | | 103 | | | | 15.00 | n.d. | 0.00 | No |
| Ex. 14 | Comparative | | 103 | 4 | 2 | | 15.45 | n.d. | 0.11 | No |

Examples 15-19

Examples 10-12 were further subjected to blending with polyamide. Examples 15-19 relied on Grilon CR8 as polyamide, and n-butylbenzensulfonamide (BBSA) as plasticizer. Polyamide blends were prepared using elastomer at a level of 102 phr (=100 phr elastomer+2 phr dusting agent) and 63 phr Grilon CR8 and 14 or 27 phr BBSA. Since comparative Examples 13 and 14 were not processible, no polyamide blends could be prepared from these materials. LANXESS Bromobutyl X2 was used instead for Example 15. Compositions of Examples 15-19 are summarized in Table 7. The barrel temperatures in these examples were 200-230° C. and screw speeds 500-700 rpm. The extrudate strand was cooled in water troughs and pelletized. The resulting pellets were dried to a humidity content under 0.08 wt. %. For the preparation of the test specimen (dumbbells) an Arburg 320-500 injection molding machine was utilized. The obtained samples were characterized as molded, no conditioning to a specific humidity was performed. Properties of the resulting materials are summarized in Table 8.

TABLE 7

| Example | MAH-grafted polymer | BBX2 | Example 12 | Example 10 | Example 11 | Grilon CR8 | BBSA | Throughput [kg/h] |
|---|---|---|---|---|---|---|---|---|
| Example 15 | No | 102 | | | | 63 | 27 | 19.05 |
| Example 16 | No | | 102 | | | 63 | 27 | 19.05 |
| Example 17 | Yes | | | 102 | | 63 | 14 | 17.71 |
| Example 18 | Yes | | | 102 | | 63 | 27 | 19.07 |
| Example 19 | Yes | | | | 102 | 63 | 27 | 19.05 |

TABLE 8

| Example | MAH-grafted polymer | Tensile strength [Mpa] | Elongation at break [%] | Tensile set [%] | Extension cycling fatigue [kilocycles] |
|---|---|---|---|---|---|
| Example 15 | No | | | | |
| Example 16 | No | 5.1 ± 0.5 | 108 ± 13 | Broke | 1.2 |
| Example 17 | Yes | 7.8 ± 0.3 | 244 ± 12 | 21.0 ± 2.3 | not tested |
| Example 18 | Yes | 6.8 ± 0.7 | 212 ± 25 | 15.0 ± 0.0 | not tested |
| Example 19 | Yes | 6.8 ± 0.3 | 251 ± 26 | 11.0 ± 2.3 | 7.3 |

Comparative Example 15 could not be processed into pellets, hence no test specimens were prepared. This shows that bromobutyl is not suitable for the preparation of polyamide elastomer blends. Comparative Example 16 (comprising a butyl ionomer without any grafted maleic anhydride) could be processed into a test specimen, but exhibited inferior properties (lower tensile strength, lower elongation at break, breaks during tensile set measurement, breaks after only 1200 cycles in flex fatigue test) vs. inventive Examples 17-19 that are based on a maleated butyl ionomer. Thus, maleated butyl ionomer gives a polyamide blend with improved properties.

The invention claimed is:

1. A method for preparing a butyl graft copolymer, the method comprising:
   reacting a halobutyl polymer with at least one of a nitrogen based nucleophile and a phosphorous based nucleophile to provide a halobutyl ionomer; and
   grafting a non-halogenated amine-reactive dienophile to the ionomer through a reactive mixing process to provide a functionalized ionomer.

2. The method according to claim 1, wherein the halobutyl polymer comprises repeating units derived from at least one isoolefin and at least one multiolefin.

3. The method according to claim 2, wherein the isoolefin comprises isobutylene and the multiolefin comprises isoprene.

4. The method according to claim 1, wherein the at least one of the nitrogen based nucleophile and the phosphorus based nucleophile is a nucleophile according to the formula

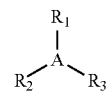

wherein:
A is a nitrogen or phosphorus, and
$R_1$, $R_2$ and $R_3$ are independently selected from the group consisting of linear or branched $C_1$-$C_{18}$ alkyl substituents, an aryl substituent which is monocyclic or composed of fused $C_4$-$C_8$ rings, and a hetero atom selected from a group consisting of B, N, O, Si, P, and S.

5. The method according to claim 1, wherein the at least one of the nitrogen based nucleophile and the phosphorous based nucleophile is triphenylphosphine.

6. The method according to claim 1, wherein the non-halogenated amine-reactive dienophile is maleic anhydride.

7. The method according to claim 1, further comprising pelletizing the functionalized ionomer.

8. The method according to claim 1, wherein:
   the isoolefin comprises isobutylene;
   the multiolefin comprises isoprene;
   the at least one of the nitrogen based nucleophile and the phosphorous based nucleophile is triphenylphosphine;
   the non-halogenated amine-reactive dienophile is maleic anhydride; and
   the method further comprises conducting the reacting and grafting in an extruder.

9. The method according to claim 8, further comprising conducting the reading and grafting in an extruder operated at a temperature of 25 to 250° C.

10. The method according to claim 9, further comprising:
   adding the at least one of the nitrogen based nucleophile and the phosphorous based nucleophile to the halobutyl polymer in the extruder; and
   adding the amine-reactive dienophile to the ionomer in the extruder.

11. The method according to claim 1, wherein the method further comprises blending the functionalized ionomer with an amino-containing thermoplastic to form a butyl rubber ionomer-thermoplastic graft copolymer.

12. The method according to claim 11, wherein the amino containing thermoplastic is a polyamide, and the method further comprises conducting the blending in an extruder.

13. The method according to claim 11, further comprising conducting both the grafting and the blending in an extruder, wherein the extruder has a beginning portion and a point downstream of the beginning portion, and the method comprises introducing the dienophile and ionomer at the beginning portion, and adding thermoplastic at the point downstream of the beginning portion.

* * * * *